Patented Mar. 29, 1949

2,465,737

UNITED STATES PATENT OFFICE 2,465,737

GAMMA-HYDROXY-N-BUTYRYL TAURINE AND SALTS THEREOF

Gustav J. Martin and Harold Urist, Philadelphia, Pa., assignors to The National Drug Company, Philadelphia, Pa., a corporation of Pennsylvania No Drawing. Application April 29, 1946, Serial No. 665,893

3 Claims. (Cl. 260—513)

This invention relates to new chemical compounds and more particularly refers to new taurine derivatives which are particularly useful chemotherapeutic agents, as well as processes for their production.

It is an object of this invention to produce reaction products of taurine and lactones. A further object is to produce a new group of compounds which are particularly suited for use as chemotherapeutic agents. An additional object is to produce gamma-hydroxy-N-butyryl taurine.

In accordance with this invention gamma-hydroxy-N-butyryl taurine is prepared by reacting a salt of taurine, for example, barium taurinate, with butyrolactone. After purification of the resulting barium salt of gamma-hydroxy-N-butyryl taurine the free compound is produced by removal of the barium therefrom. This process may be more readily understood by consideration of the following illustrative example.

Example 31.5 grams of barium hydroxide containing 8 molecules of water per molecule of barium hydroxide are dissolved in hot water and filtered. To the filtrate is added 25 grams of taurine, and the reaction mixture is evaporated to dryness in vacuo. 35 grams of barium taurinate, a white powder, are obtained, corresponding to a yield of 91.5%.

9.6 grams of barium taurinate produced as above and 5 c. c. of butyrolactone are mixed and heated in an oil bath at 150° C. for 5 hours. The residue from this reaction was washed with hot methyl alcohol and dried at 110° C. 11.4 grams of the barium salt of gamma-hydroxy-N-butyryl taurine were obtained. Upon analysis this product was found to contain the following amounts of barium: 24.38, 24.28. Calculated: 24.62.

Gamma-hydroxy-N-butyryl taurine is obtained from the above salt in accordance with standard technique, for instance, by treatment with sulfuric acid or a similar material.

While gamma-hydroxy-N-butyryl taurine is a preferred embodiment of this invention it is contemplated that other derivatives thereof may be obtained by the selection of suitably substituted reactants, for instance, in place of taurine, derivatives thereof such as alpha amino propionic acid (alpha-alanine), etc., may be employed. In the same manner, instead of butyrolactone it is contemplated that other lactones, preferably, but not necessarily, gamma lactones, may be utilized.

The salts of the above compounds may be employed as such, for instance, when it is desired to store the compounds over long periods without appreciable decomposition. Further, these salts may be used as intermediates for the preparation of derivatives of the described compounds. In this connection it is contemplated that salts other than the barium salt may be prepared. Such salts will be prepared in a manner set up in the above example except that the desired salt will be substituted for the barium hydroxide referred to therein. Where the free compound is desired the salt thereof may be readily converted by treatment with acids or similar materials.

The compounds of this invention, and in particular the preferred compound, gamma-hydroxy-N-butyryl taurine, are particularly useful for a variety of purposes. They are effective chemotherapeutic agents, both in vivo and in vitro, against staphylococcus, streptococcus, pneumococcus and other pathogenic bacteria. Likewise they have value as analgesics.

Gamma-hydroxy-N-butyryl taurine was found effective in concentrations of 10 micrograms per c. c. in completely inhibiting the growth of *Escherichia coli* and *Lactobacillus casei*. This compound was also effective in concentrations of 1 microgram per c. c. against streptococci.

As many apparently widely different embodiment of this invention may be made without departing from the spirit and scope hereof, it is to be understood that the invention is not limited to the specific embodiments described herein, except as defined in the appended claims.

We claim:
1. Salts of gamma-hydroxy-N-butyryl taurine.
2. The barium salt of gamma-hydroxy-N-butyryl taurine.
3. Gamma-hydroxy-N-butyryl taurine.

GUSTAV J. MARTIN.
HAROLD URIST.

REFERENCES CITED

The following references are of record in the file of this patent:

UNITED STATES PATENTS

| Number | Name | Date |
|---|---|---|
| 2,348,425 | Snell | May 9, 1944 |

OTHER REFERENCES

Spath et al., "Ber. Deut. Chem.," vol. 69, pages 2727–2731 (1936).